(12) United States Patent
Schreiber et al.

(10) Patent No.: US 9,431,041 B1
(45) Date of Patent: Aug. 30, 2016

(54) COMB STRUCTURE FOR A DISK DRIVE SUSPENSION PIEZOELECTRIC MICROACTUATOR OPERATING IN THE D33 MODE, AND METHOD OF MANUFACTURING THE SAME

(71) Applicant: Magnecomp Corporation, Murrieta, CA (US)

(72) Inventors: Christopher Schreiber, Nonthabury (TH); Christopher Dunn, Austin, TX (US); Peter Hahn, Wildomar, CA (US); Kuen Chee Ee, Chino, CA (US)

(73) Assignee: MAGNECOMP CORPORATION, Murrieta, CA (US)

( * ) Notice: Subject to any disclaimer, the term of this patent is extended or adjusted under 35 U.S.C. 154(b) by 0 days.

(21) Appl. No.: 14/619,946

(22) Filed: Feb. 11, 2015

Related U.S. Application Data

(60) Provisional application No. 61/940,812, filed on Feb. 17, 2014.

(51) Int. Cl.
*G11B 5/54* (2006.01)
*G11B 5/48* (2006.01)

(52) U.S. Cl.
CPC ............ *G11B 5/4833* (2013.01); *G11B 5/483* (2015.09); *G11B 5/4873* (2013.01)

(58) Field of Classification Search
None
See application file for complete search history.

(56) References Cited

U.S. PATENT DOCUMENTS

| | | | |
|---|---|---|---|
| 4,633,121 A | 12/1986 | Ogawa et al. | |
| 6,747,396 B2 * | 6/2004 | Blom | B41J 2/14274 310/328 |
| 6,794,800 B1 | 9/2004 | Heinz | |
| 6,943,483 B2 | 9/2005 | Takeuchi et al. | |
| 7,246,420 B2 | 7/2007 | Takeuchi et al. | |
| 7,282,836 B2 * | 10/2007 | Kwon | H01L 41/094 310/328 |
| 2004/0120081 A1 * | 6/2004 | Kurihara | G11B 5/4826 360/294.4 |
| 2004/0256955 A1 * | 12/2004 | Okazawa | B41J 2/1612 310/328 |
| 2009/0195938 A1 * | 8/2009 | Yao | G11B 5/4826 360/294.4 |
| 2011/0084571 A1 * | 4/2011 | Nakatani | G11B 5/4833 310/328 |
| 2013/0069490 A1 * | 3/2013 | Nakamura | G11B 5/4813 310/364 |

* cited by examiner

*Primary Examiner* — Carlos E Garcia
(74) *Attorney, Agent, or Firm* — Intellectual Property Law Offices of Joel Voelzke, APC

(57) ABSTRACT

A microactuator assembly is formed by depositing PZT material over electrode gaps, the electrode gaps being defined by the spaces between interleaved fingers of metal that define alternating plus and minus electrodes. The PZT material is hardened and poled. The PZT material may be deposited and poled either as isolated islands of PZT material across respective electrode gaps, or as a continuous sheet of PZT material with localized areas of that material being poled and then activated. The individual PZT elements are arranged such that successive PZT elements extend in the same direction as across the electrode gaps. The resulting microactuator assembly acts in the d33 direction of the PZT elements. The electrodes have raised or recessed features such as ribs or castellations, with the PZT material mating with those features, thus anchoring the PZT material to the electrodes.

22 Claims, 16 Drawing Sheets

COMB STRUCTURE FOR A DISK DRIVE SUSPENSION PIEZOELECTRIC MICROACTUATOR OPERATING IN THE D33 MODE, AND METHOD OF MANUFACTURING THE SAME

CROSS-REFERENCE TO RELATED APPLICATIONS

This application claims priority from provisional patent application No. 61/940,812 filed Feb. 17, 2014.

BACKGROUND OF THE INVENTION

1. Field of the Invention

This invention relates to the field of microactuators for disk drive suspensions. More particularly, this invention relates to the field of a disk drive suspension piezoelectric microactuator assembly having a comb structure and operating in the d33 mode, and a method of manufacturing and integrating such a microactuator motor assembly.

2. Description of Related Art

Dual stage actuated (DSA) suspensions for disk drives are known. DSA suspensions employ a standard voice coil motor (VCM) or similar primary actuator which moves the entire suspension arm, and in addition they employ a second actuator referred to as a microactuator located on the suspension arm itself. The microactuator moves only a portion of the suspension arm depending on the exact location of the microactuators. Most microactuators are piezoelectric devices made of lead zirconate titanate (PZT). Such a microactuator may be referred to simply as a "PZT" herein for simplicity without intending any limitation as to the particular piezoelectric material used.

A typical PZT device used as a suspension microactuator 2 is shown in FIG. 1. The piezoelectric element 8 is sandwiched between a top electrode 4 and a bottom electrode 6. The device is poled using top and bottom electrodes 4, 6. This poling, combined with subsequent activation of the device using those same electrodes, produces both d31 and d33 expansion/contraction, with the d31 mode of expansion/contraction being mechanically coupled to produce fine movements of the suspension head. The device thus operates in the d31 mode. Multilayer (vertically stacked) microactuators have been proposed before that operate in the d33 mode.

Typical electrical connections to such devices are seen, for example, in commonly owned U.S. Pat. No. 8,498,082 and copending and commonly owned U.S. patent application Ser. No. 14/045,773. Another electrical connection technique that was previously used by the assignee of the present invention, by which is not admitted as being "prior art" within the legal meaning of that term, is shown in FIGS. 1 and 2 of provisional patent application No. 61/940,812 from which priority is claimed.

When an actuating voltage is applied to the PZT, the PZT expands and contracts lengthwise in the d31 mode of the piezoelectric material, and that d31 expansion or contraction is harnessed to move the suspension head radially across the data disk for fine position of the head over the desired data track.

PZT microactuators of this type are complex to mechanically and electrically integrate into a suspension, requiring a challenging sequence of steps to terminate the PZT often from opposing sides and multiple applications of both conductive and structural adhesives that must be thermally cured. The thermal curing can negatively impact performance of the PZT if the cure temperature approaches the Curie temperature. In one process used by the assignee of the present invention the typical PZT attachment process required 52 separate process steps.

Thin film sputtered bending microactuators have also been proposed although such devices are complex to integrate into a suspension. U.S. Pat. No. 7,282,836 discloses a PZT device in which different length electrodes result in a bending action.

SUMMARY OF THE INVENTION

The present invention is of a new structure of a PZT device for use as a microactuator on a disk drive suspension, and a method of manufacturing such a device. Unlike prior d33 mode device that comprise layers stacked vertically, the microactuator of the present invention can operate in the d33 mode with only a single vertical layer of PZT material. The PZT microactuator assembly according to an illustrative embodiment of the present invention has a comb structure as seen in FIG. 2. Instead of the device having top and bottom electrodes, thus requiring top and bottom electrical connections, all of the electrodes and hence all of the electrical connections are on the same horizontal level, thus greatly simplifying the electrical interconnections to the device and the integration of the device into the assembly.

One method of manufacturing the device begins with a piece of stainless steel ("SST") or other material that will constitute the electrodes of the device. The + and − electrodes are interweaved in a comb configuration with the PZT material bridging the gaps between the + and − electrodes.

PZT material is deposited onto and between the electrodes using any one of various techniques, and sintered in situ. The PZT material is then poled. The result is a PZT microactuator that is composed of a number of individual PZT devices each expanding in their d33 modes in the longitudinal direction.

In a variation, the PZT elements takes the form of a single continuous sheet of PZT material that extends over and into all of the between-finger electrode gaps, with the localized electric fields created by the interlacing fingers creating localized d33 activation of the PZT sheet.

A microactuator constructed according to the invention has a number of advantages over conventional PZTs and conventional PZT attachment techniques. First, the microactuator takes advantage of the d33 mode of expansion, which is approximately two times as large as the d31 mode. The invention therefore allows for greater stroke length per unit of input voltage than various prior art microactuators.

Second, because the microactuator assembly has its "plus" and "minus" electrodes on the same surface or face rather than on opposite faces as with conventional PZT microactuator, it is much easier to integrate the microactuator assembly into a DSA suspension than it was to integrate conventional individual bulk PZTs into a DSA suspension, and requires far fewer assembly steps. In one implementation, the microactuator assembly can be fabricated separately from the suspension, then laser welded into the suspension as an assembly. Because the use of adhesives is significantly reduced, the associated dry joints, epoxy out gassing, and contaminating silver or epoxy particle shed is also reduced.

Third, because the use of adhesives to integrate the microactuator to the suspension is eliminated or significantly reduced, the mass of the device can be more precisely controlled. Both reducing and controlling the mass of the microactuator is particularly important in suspension designs in which the microactuators are placed on or near the gimbal which carries the read/write head.

Fourth, the microactuator motor can be poled using alternating-current-assisted poling, in which a current is passed through the device as part of the poling process. It is anticipated that current-assisted poling, particularly AC-assisted poling, will allow for various enhanced characteristics of the PZT devices. The present invention allows the ceramic to be deposited upon the electrodes as opposed to the traditional manufacturing process wherein the electrodes are applied to the sintered PZT. Having electrodes in place prior to the sintering process facilitates sintering under an electrical bias current that has previously not been possible. Research indicates the current assisted sintering will produce additionally enhanced characteristics.

Another advantage of the invention is that encapsulation is not needed to prevent PZT particle shed. The microactuator assembly is composed of individual PZT elements that are sintered ceramic. Because the device including its edges is sintered, the device does not have sawed edges as does a microactuator that has been sawn from a conventional bulk PZT wafer. Such sawed edges are porous and have stressed and segmented partial grains exposed, which leaves them prone to particulate shed if those exposed edges are not encapsulated by epoxy or a similar encapsulant. Particles that have been shed from a PZT into a suspension can damage the surface of the magnetic data disk, possibly even leading to disastrous failure of the disk drive. Accordingly, in conventional PZT microactuators the sawn edges must be encapsulated such as by an encapsulating polymer applied around the edges.

Such encapsulation process steps are not necessary using the present invention. The sintered edges of microactuators according to the present invention versus the sawn edges of a bulk PZT are analogous to glazed edges versus sawn edges of ceramic tile.

The individual PZT devices of the present invention also have small electrode gaps compared to certain bender PZT devices. This will allow for small driving voltages while still achieving high stroke lengths. It is also believed that the microactuators will exhibit less out-of-plane deflection. The invention additionally anticipates the forming of raised or recessed features such as mechanical dimples, ribs or castellations either by forming or altered metal thickness of the electrodes to further restrain the deflection within the preferred plane.

Further, due to the shrinkage of the PZT device during the hardening step such as sintering, the PZT elements will be under tension which results in an even higher stroke length. Such tension is referred to as "preload" in stacked PZT assemblies.

Still further, the microactuator motor assembly can be gang polled, i.e., all of its constituent PZT elements can be poled simultaneously.

Additionally, the displacement of the device is expected to be more purely in-plane with less out-of-plane movement than in traditional bender PZT microactuators. However, by controlling the relative gap sizes and/or z-dimension features such as holes formed in the electrodes, in addition to the primary direction of movement, the device can be made to exhibit rotational movement and/or movement that is orthogonal to the primary direction of movement, which can be advantageously harnessed by appropriate mechanical coupling to effect fine movements of the read/write head in a suspension assembly, or in applications other than disk drive suspensions.

The device can be either integrally formed onto a suspension with the piezoelectric element(s) being deposited and disposed directly on integral stainless steel parts of the suspension, or the device can be formed separately and later affixed to the suspension such as by laser welding.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
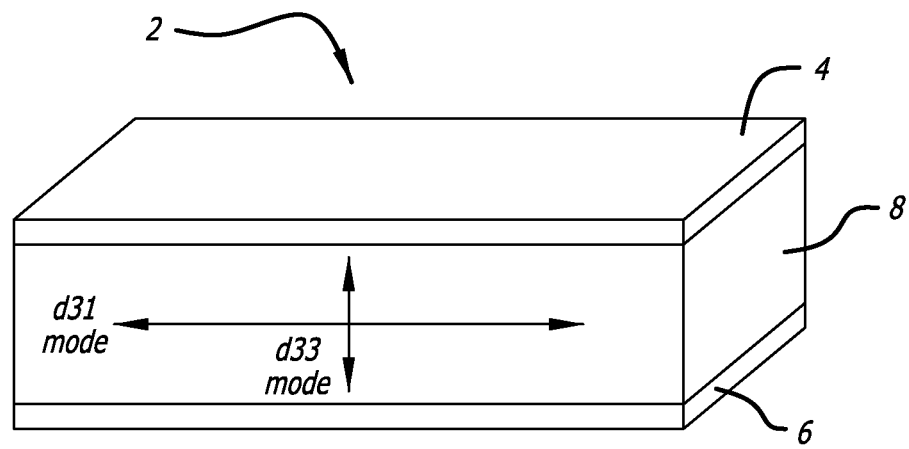
FIG. 1 is a perspective view of a prior art bulk PZT microactuator assembly.
Figure 2:
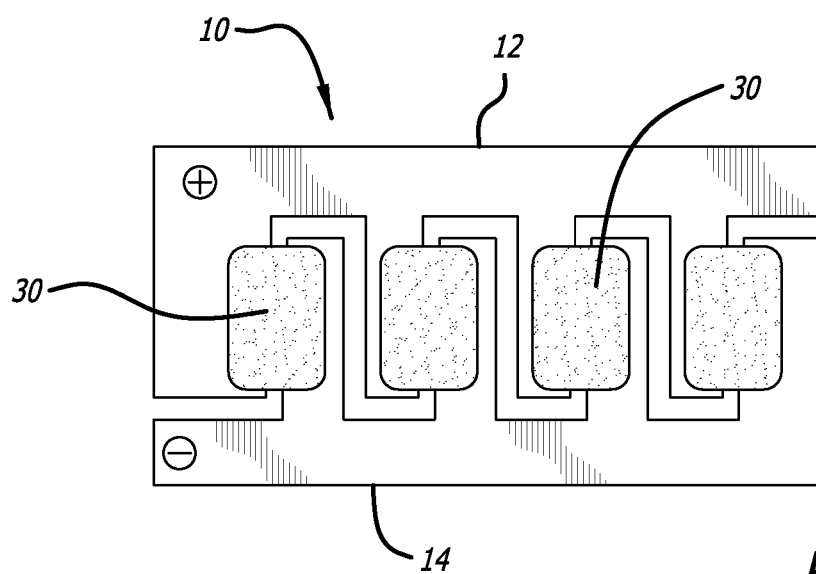
FIG. 2 is a top plan view of a microactuator assembly according to an exemplary embodiment of the present invention.
Figure 3:
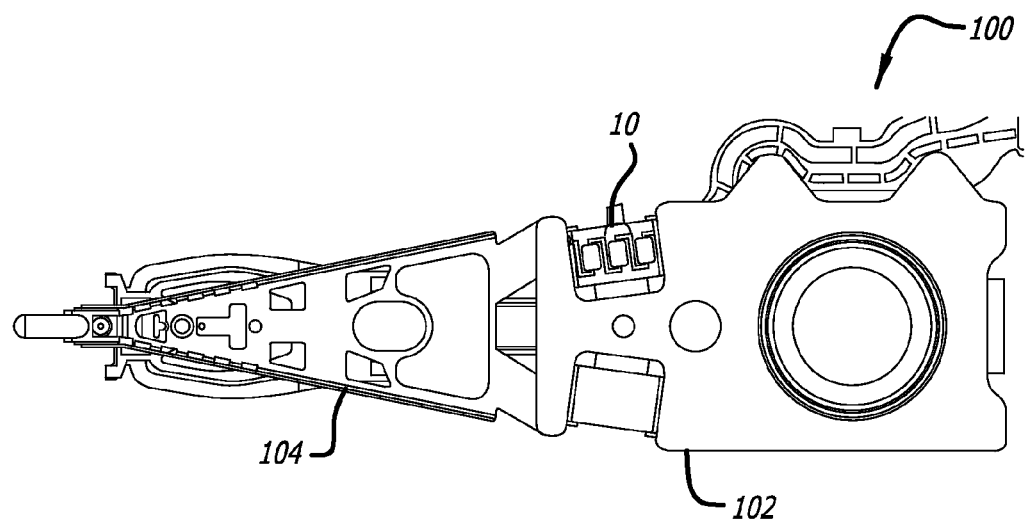
FIG. 3 is a top plan view of a suspension assembly which the microactuator assembly of FIG. 2 is integrated.

FIG. 2 is a top plan view of a microactuator assembly 10 according to an exemplary embodiment of the present invention, and FIG. 3 is a top plan view of a suspension assembly 100 in which the microactuator assembly 10 of FIG. 2 is integrated thereto such as by in situ forming integral stainless steel parts of the suspension or by later affixing. It will be understood that FIG. 2 is illustrative only. In the suspension 100 as shown, microactuator assembly 10 is located on the base plate 102. Alternatively, generally speaking microactuator assembly 10 could be located on load beam 104, on or at the gimbal area, or in any other location on which a microactuator motor can be used to effect fine movements of the read/write head carried by the suspension assembly.

Figure 4:
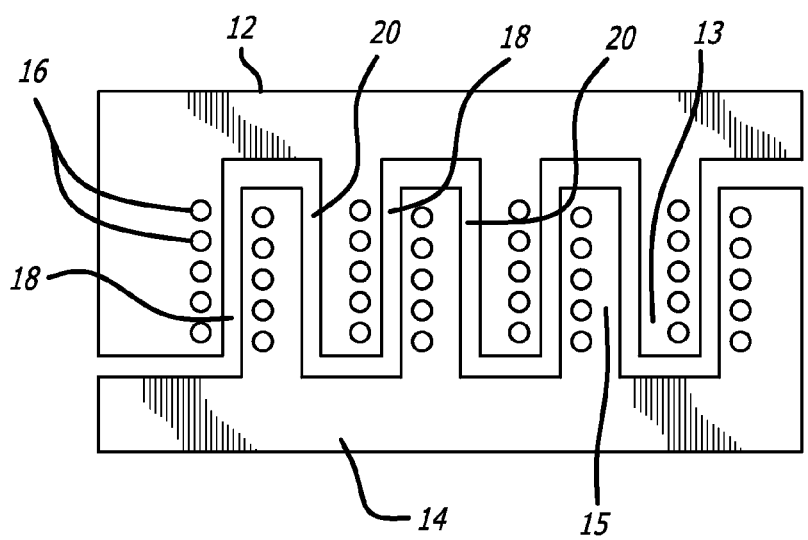
FIG. 4 is a top plan view of a patterned electrode sheet of the microactuator assembly of FIG. 2 before the piezoelectric material is added.

FIG. 4 is a top plan view of a patterned electrode sheet of the microactuator assembly 10 of FIG. 2 before the piezoelectric elements 30 are added. The process begins using a sheet of stainless steel that will be called a precursors sheet. The precursor sheet is etched to produce the structure shown in FIG. 4.

Microactuator assembly 10 includes a first electrode 12, designated for discussion purpose only as the "plus" electrode, and a second electrode 14, designated for discussion purposes only as the "minus" electrode. Electrodes 12 and 14 have interlaced or interleaved elongate conductive components or fingers 13, 15 defining electrical gaps or electrode gaps 18, 20 between the interlaced fingers. Piezoelectric material or elements 30 span and fill electrode gaps 18, 20.

Figure 18:
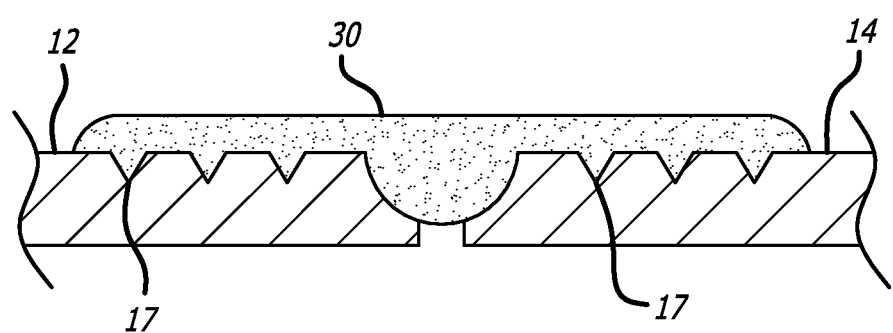
FIG. 18 is a side sectional view of a microactuator assembly according to an additional embodiment.

The method of manufacturing the device according to a first illustrative embodiment begins with a plate or sheet of stainless steel ("SST") or other material that will constitute the electrodes 12, 14 of the device. If the material is SST, then preferably the SST is first plated with nickel and/or gold or other metals or combinations of metal that protect against corrosion and/or enhance the adhesion of the PZT material 30 to the SST. The SST plate is then etched all the way through in order to separate out the "plus" electrode 12 from the "minus" electrode 14, such as via the serpentine etch pattern shown in FIG. 4 including electrode gaps 18, 20 between interlaced fingers 13, 15 of electrodes 12, 14. The "plus" and "minus" electrodes are interweaved in a comb configuration, with the successive ones of the fingers, and successive ones of the gaps, both proceeding in a first direction, namely the x-direction as shown in the figure. Z-dimension features such as holes or vias 16 are preferably formed into the electrodes in order to help anchor the PZT elements 30 to the electrodes. The z-dimension features can take any of many forms, including but not limited to holes, vias, recesses, valleys, trenches, channels, ribs, and castellations, including V-shaped trenches 17 stamped into the electrodes and the resulting ridges between the trenches as shown in FIG. 18. Mechanically anchoring the PZT material to the electrodes such as using vias 16 is particularly important because the PZT material typically shrinks by approximately 8-10% in most sintering operations.

PZT material is then deposited over the electrodes, into the gaps between the electrodes, and into the anchoring z-dimension features, to define individual PZT elements 30. The PZT material may be deposited by any one of a number of techniques including but not limited to: electrophoresis; sol-gel/slurry; evaporation; electrophoretic deposition also called electrostatic plating, and which is an emerging technology; e-deposit; RF sputtering, i.e., metal-organic chemical vapor deposition (MOCVD); stencil printing; microdispense such as ink jet; or micromolding techniques such as a micromold powder with a binder. Sol-gel deposition of PZT films is discussed in Brian Leclerc, "Process Optimization for Sol-Gel PZT Films," Master's of Science Thesis, Queens University, Kingston, Ontario, Canada, March 1999, which his hereby incorporated by reference in its entirety. The sol-gel process is generally considered technically easy and low-cost to implement. Additionally, the stoichiometry of the resulting film can be easily controlled. Electrophoresis can also be used to deposit encapsulation onto the PZT elements 360 degrees around their peripheries thus producing smooth edges on the PZT elements, thus significantly reducing particle shed from that experienced by bulk PZTs that are sawn at their edges, which sawing produces a raw edge.

If electrophoresis is used to deposit the PZT material, an additional advantage is realized. The narrow electrode gaps 18 will be the areas of greatest current density during the deposition process, and therefore even if a mask is not used, these electrode gaps will be the areas having the most PZT material deposited. Depositing the PZT material primarily in these areas is advantageous because the gaps 18 are also the areas that experience the highest electric fields when an activation voltage is applied across the electrodes and thus the gaps 18 produce the greatest "payoff" per unit of PZT material deposited.

Stereolithography (SLA) also known as optical fabrication, photo-solidification, solid free-form fabrication, and solid imaging, could also be used to deposit the PZT material. SLA is an additive manufacturing (or 3D printing) technology often used for producing models and prototypes. SLA manufacturing equipment is available from Paramount Industries, Inc. of Longhorn, Pa. (www.paramountind.com).

It is anticipated that the assembly would then be placed in a low temperature oven bake (e.g., 120° C. for 10 minutes) in order to drive off water or vapor from the sol-gel or other slurry form of PZT before full sintering.

Laser annealing of PZT films is discussed in Srinivas Kuchipudi et al, "Laser Annealing of Pb($Zr_{0.52}Ti_{0.48}$)$O_3$ Thin Films Using Pulsed Excimer (KrF) Laser," Integrated Ferroelectrics: an International Journal, Vol. 52, Issue 1 (2003), which is hereby incorporated by reference in its entirety. The Excimer laser provides a room-temperature sinter. Emerging techniques such as Radiative Transfer Coefficient (RTC) sintering that employ a laser or lamp to rapidly sinter materials could be used to sinter the PZT.

The unsintered PZT material may have binders in it which help provide resiliency to the device that provides some flexibility and hence some mechanical robustness to the device before sintering. The binders are typically burnt off by the sintering process.

Laser or lamp sintering selectively sinters or transforms the B-staged PZT non ferroelectric amorphous or pyrochlore phase into the desired perovskite phase with mainly (100) and (110) oriented grain structure in the irradiated regions. Such lamp or laser sintering has been demonstrated to produce such sintering effectively in very short times. It is anticipated that production processes will result in sintering times on the order of 10 seconds.

Because the electrodes are already in place during the PZT deposition and sintering processes, a current can be passed through those electrodes during deposition and sintering. Depositing the PZT upon the electrode, unlike the traditional methods wherein the electrodes are applied to the PZT material post sintering, allows current assisted sintering to be performed on the PZT material. The current passed through the electrodes during sintering can be DC current, AC current, or AC current with a DC offset. Furthermore, the current can be continuous current or pulsed current. Current assisted sintering of PZT material is expected to produce the benefits of enhanced stroke performance resulting from optimized crystal structure, alloy mixture, and other characteristics of the material.

Figure 5:
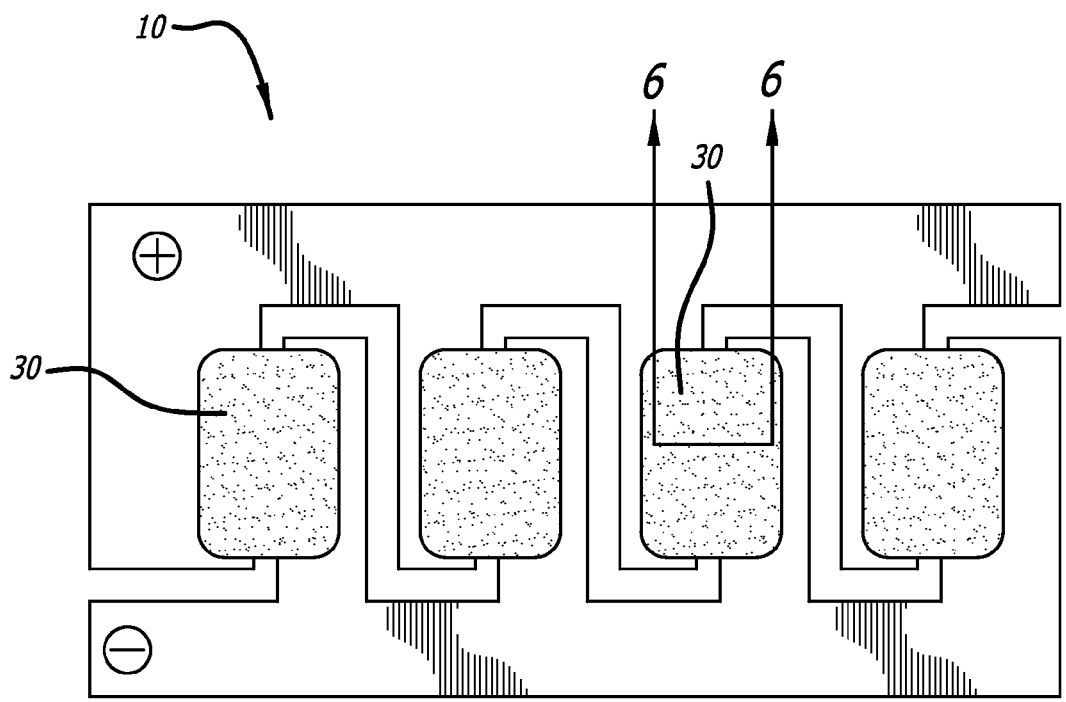
FIG. 5 is a top plan view of the microactuator assembly of FIG. 2.
Figure 6:
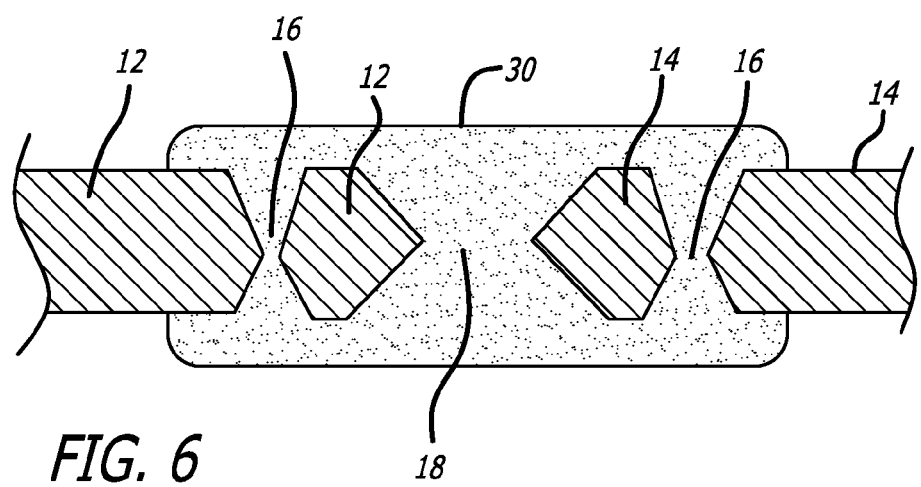
FIG. 6 is a sectional view of the microactuator assembly of FIG. 5 taken along section line 6-6.

FIG. 5 is a top plan view of the microactuator assembly of FIG. 2, and FIG. 6 is a sectional view of the microactuator assembly of FIG. 5 taken along section line 6-6. PZT elements 30 are located between the fingers of electrodes 12, 14 and spanning the electrode gaps 18. PZT elements 30 also extend onto the fingers beyond the gaps, and over and into holes 16 or other z-dimension anchoring features. As shown, PZT element 30 extends both between the fingers, above the plane defined by the top surface of electrodes 12, 14, and below the plane defined by the bottom surface of electrodes 12, 14 and over the top and bottom of those electrode finger surfaces. The PZT elements and the electrode gaps are arranged serially along a line that extends through the PZT elements. When a voltage is applied across electrodes 12, 14, depending upon the polarity of the applied voltage those electrodes are pushed apart by the expansion of PZT material 30, or are pulled closer together by the contraction of PZT material 30. In this particular embodiment, only alternate ones of the electrode gaps are spanned by piezoelectric material.

Figure 7:
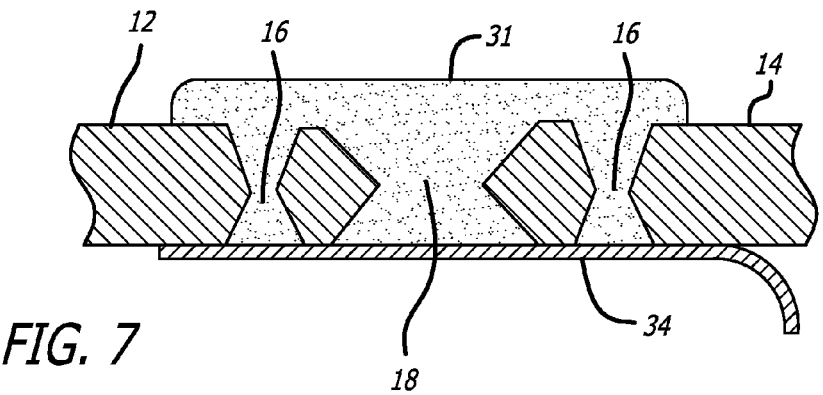
FIG. 7 is a side sectional view of the microactuator assembly of FIG. 5 that was produced using an alternate construction method, taken along section line 6-6.

Various alternative process flows are possible. FIG. 7 is a side sectional view of the microactuator assembly of FIG. 5 that was produced using a slightly different construction method, taken along section line 6-6. In this method, a carrier film or tape 34 is applied to the underside of the electrodes 12, 14 in the area of gaps 18 and holes 16, and the PZT material is applied over those features. Tape 34 functions as the bottom of a mold to hold the PZT material in place until it is sintered or otherwise at least partially hardened to form PZT elements 31. Tape such as carrier tape commonly used in silicon wafer circuit processing has a limited tack that would not lift off the green (cured but unsintered) PZT material from holes 16 and gap 18. Tape 34 is then removed. The result is piezoelectric material that is located between the electrodes, and extends onto the top surfaces of those electrodes, but not onto the bottom surfaces. Optionally, the assembly could then be turned over and the bottom portion patterned with PZT material, resulting in PZT material on both the top and bottom sides of the electrodes as shown in FIG. 6. Alternatively, a resist mask could also be used that would be turned to ash during the high temperature sintering.

After the PZT material has been deposited and sintered, the PZT elements 30 are then poled by applying a poling voltage across electrodes 12, 14. This produces a poling such that when an activation voltage is later applied across those same electrodes, the d33 directions of the PZT elements are all aligned in a common direction, namely in the same direction as the line that extends through individual successive ones of the PZT elements.

Figure 8:
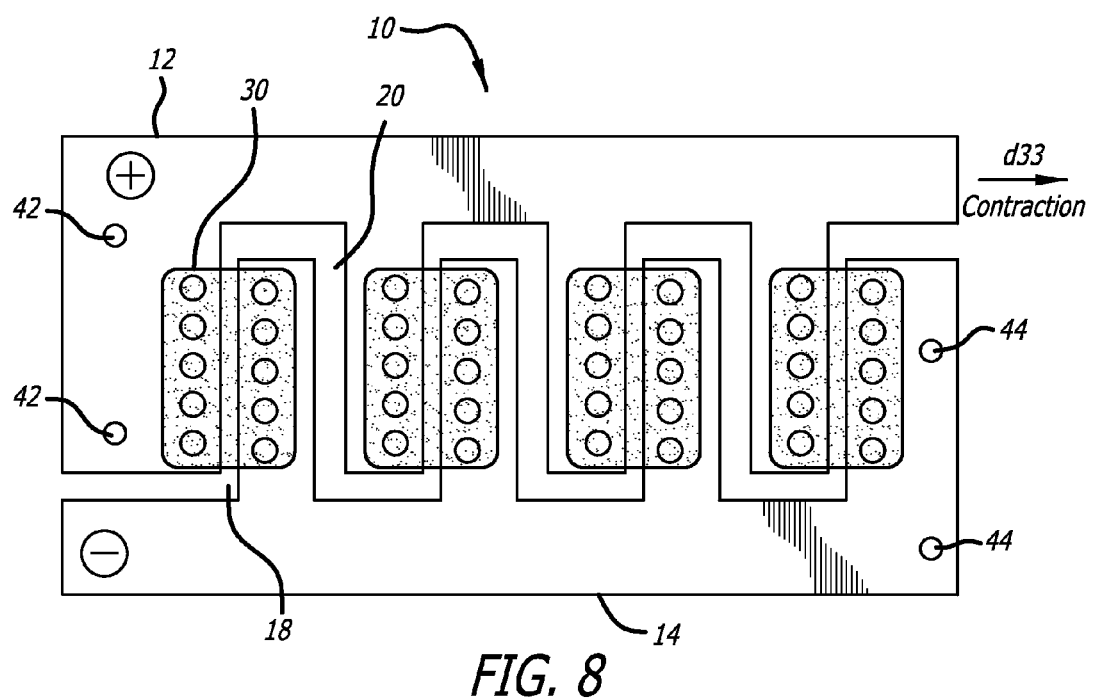
FIG. 8 is a top plan view of a microactuator assembly according to an embodiment of the invention, with the PZTs being drawn see-through to reveal the via anchor structure of the electrodes below.

FIG. 8 is a top plan view of a microactuator assembly 10 of FIG. 2, with the PZT elements 30 being drawn in ghost fashion to reveal the via anchor structure of the electrodes. In this illustration, the device has been formed as a discrete assembly and will be welded to the suspension at weld locations 42, 44. Normally the "minus" electrode 14 would be welded to a grounded portion of the suspension, and the "plus" electrode 12 would be electrically connected to the activation voltage signal conductor on the flexure assembly circuit trace and would be electrically isolated from ground. The arrow shows the direction of travel of "plus" electrode 12 when the ground electrode 14 is welded to a stationary portion of the suspension assembly 100 and a voltage is applied so that PZT elements 30 undergo d33 mode contraction.

Figure 9:
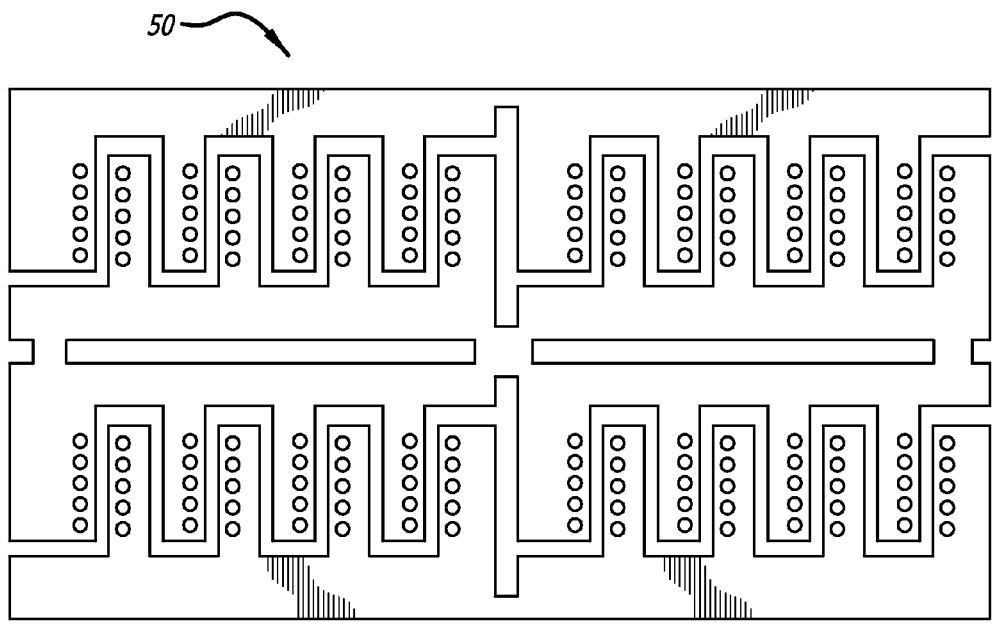
FIG. 9 is a top plan view of a patterned precursor stainless steel sheet containing multiple ones of the patterned electrode sheet of FIG. 4, before PZT material has been applied.
Figure 10:
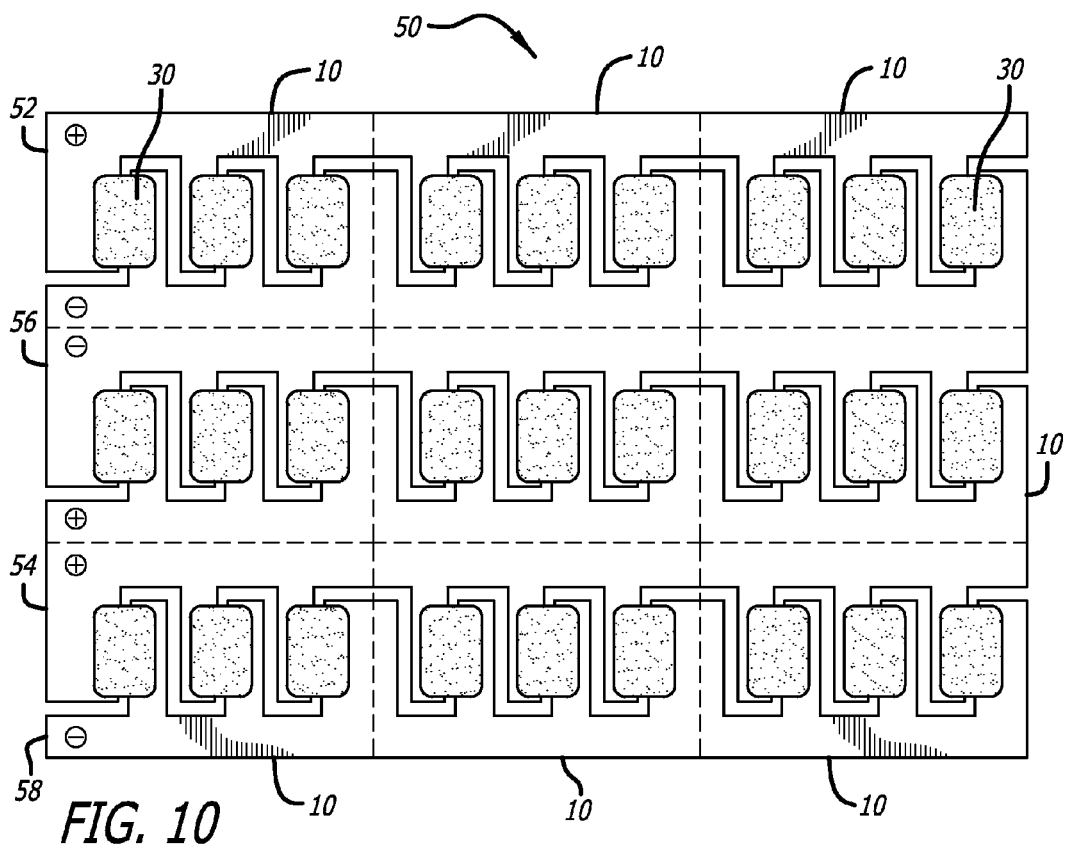
FIG. 10 is a top plan view of a sheet containing multiple piezoelectric microactuators 10 before the individual devices have been singulated.

Microactuator assemblies 10 can be formed many at a time, such as shown in the process steps illustrated in FIGS. 9 and 10. FIG. 9 is a top plan view of a patterned precursor stainless steel sheet 50 containing multiple ones of the patterned electrode sheet of FIG. 4, before PZT material has been applied and sintered and before the individual microactuators 10 have been singulated from the sheet.

FIG. 10 is a top plan view of a patterned stainless steel sheet 50 containing multiple piezoelectric microactuators 10, after the stainless steel sheet has been patterned and piezoelectric material 30 applied and sintered, but before the individual microactuator assemblies 10 have been singulated from the sheet. Typically an entire sheet 50 of the devices would be polled before singulation. In the figure, a total of four electrodes are used for poling: a "plus" poling voltage is applied to electrodes 52 and 54, and a "minus" poling voltage is applied to electrodes 56 and 58.

Figure 11:
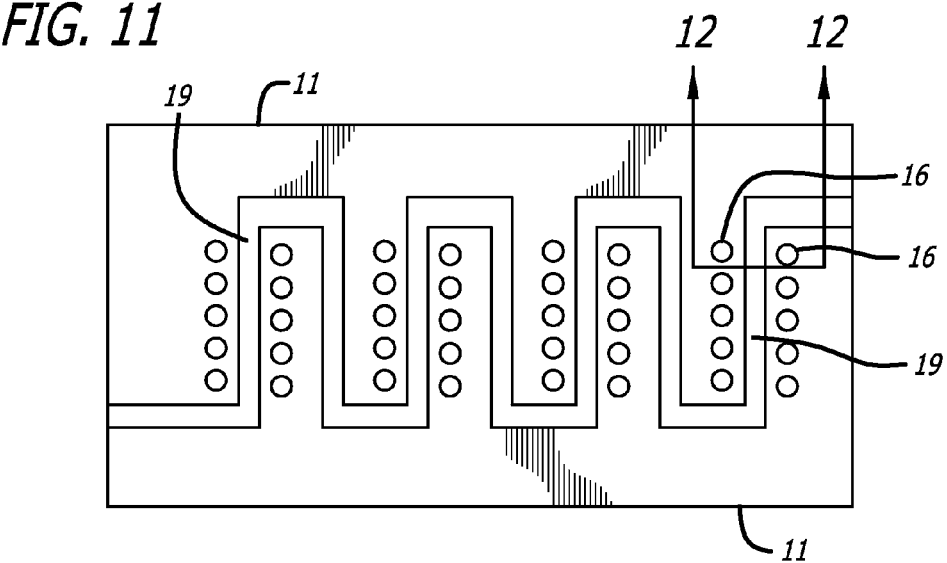
FIGS. 11, 13, and 15 illustrate manufacturing steps in making the microactuator assembly of FIG. 2 according to an alternate manufacturing process.
Figure 12:
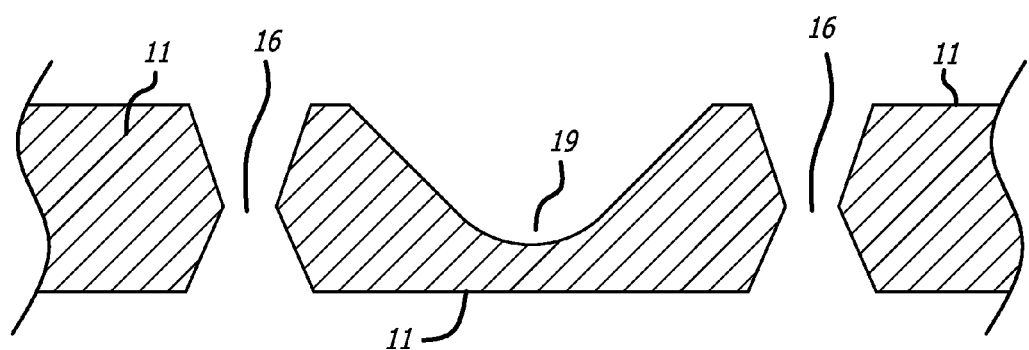
FIGS. 12, 14, and 16 are sectional views of the devices shown in FIGS. 11, 13, and 15, respectively, taken alone the section lines 12-12, 14-14, and 16-16, respectively.
Figure 13:
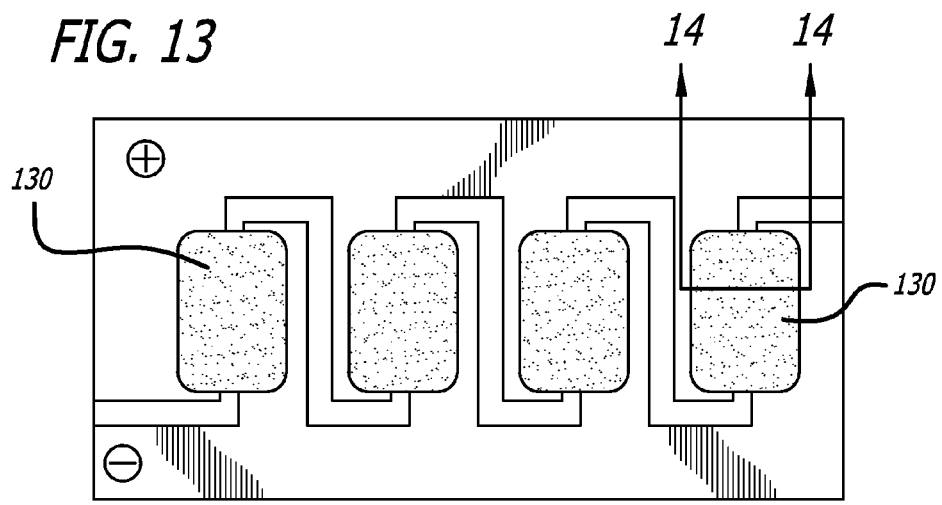
Figure 14:
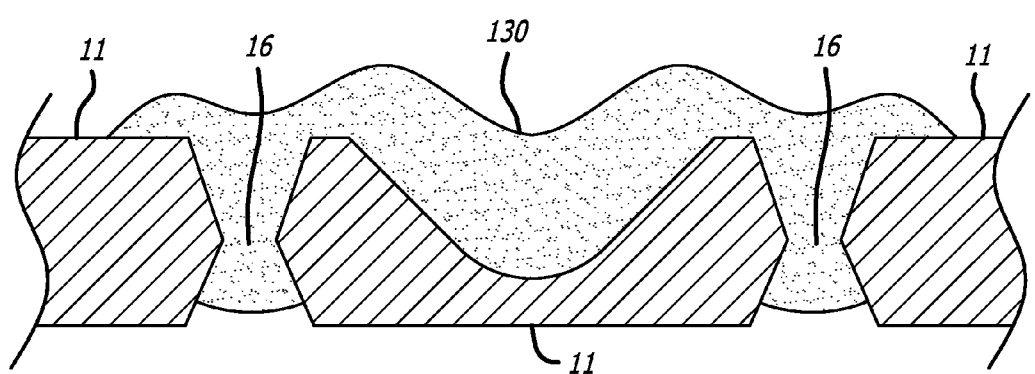
Figure 15:
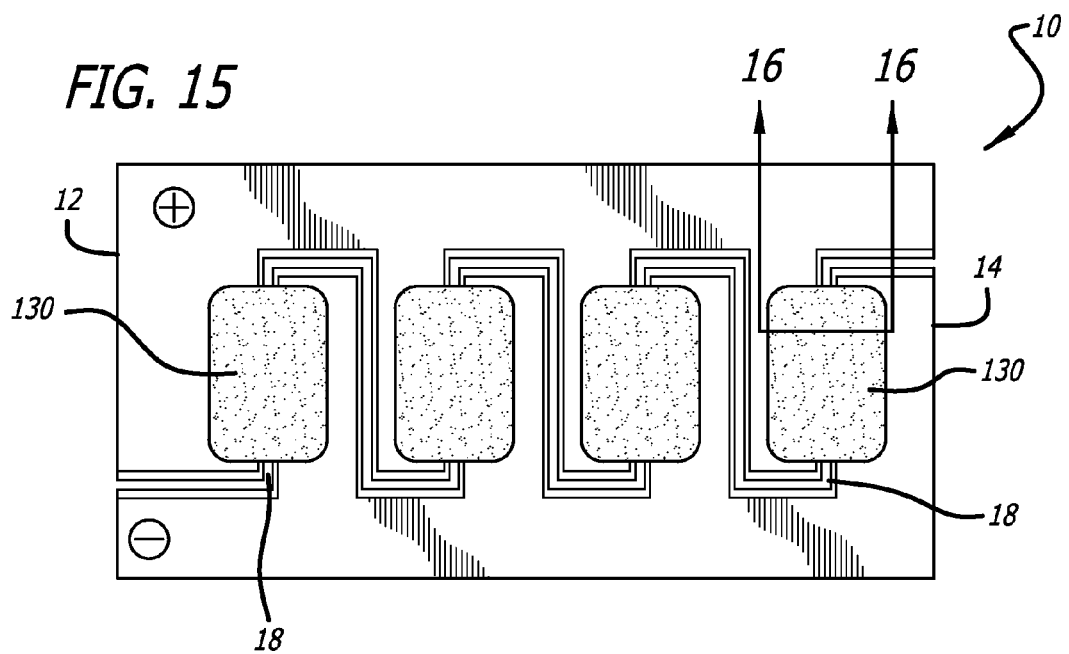
Figure 16:
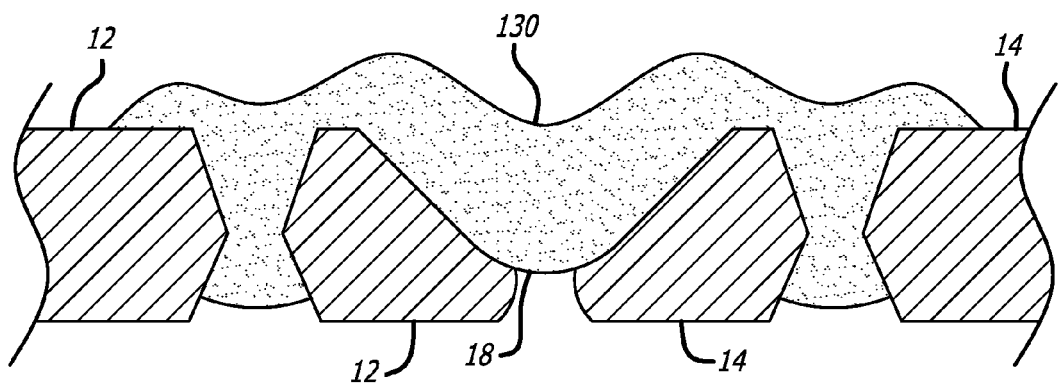

FIGS. 11, 13, and 15 illustrate manufacturing steps in making the microactuator assembly 10 of FIG. 2 according to an alternate manufacturing process. FIGS. 12, 14, and 16 are sectional views of the devices shown in FIGS. 11, 13, and 15, respectively, taken alone the section lines 12-12, 14-14, and 16-16, respectively.

In FIG. 11 and corresponding sectional view FIG. 12 a first etching step is performed on SST sheet 11. This first etching step produces holes 16 or other such z-dimension features for mechanical anchoring of the PZT material. Holes 16 may be etched all the way through SST sheet 11 or only partially through. However, this first etching step does not etch an electrode gap all the way through the sheet. Rather, channel 19, which will eventually become electrode gap 18, is etched only partway through sheet 11 for now. Sheet 11 has therefore not yet been divided into two separate electrodes.

In FIG. 13 and corresponding sectional view FIG. 14 PZT material 130 is deposited into holes 16 and into channel 19. The surface topography of the PZT material 130 depends upon the deposition method chosen.

In FIG. 15 and corresponding sectional view FIG. 16, in a second etching step SST sheet 11 is etched from the bottom side thus completing electrode gap 18 and dividing SST sheet 11 into two electrically separated electrodes 12 and 14. The device 10 is now ready for poling and thereafter for use as a PZT microactuator.

An advantage of this manufacturing process is that the second etching step allows for very precise control of the width of electrode gap 18. Precisely controlling the width of electrode gap 18 is important both in order to maximize PZT stroke length and for repeatability.

Figure 17:
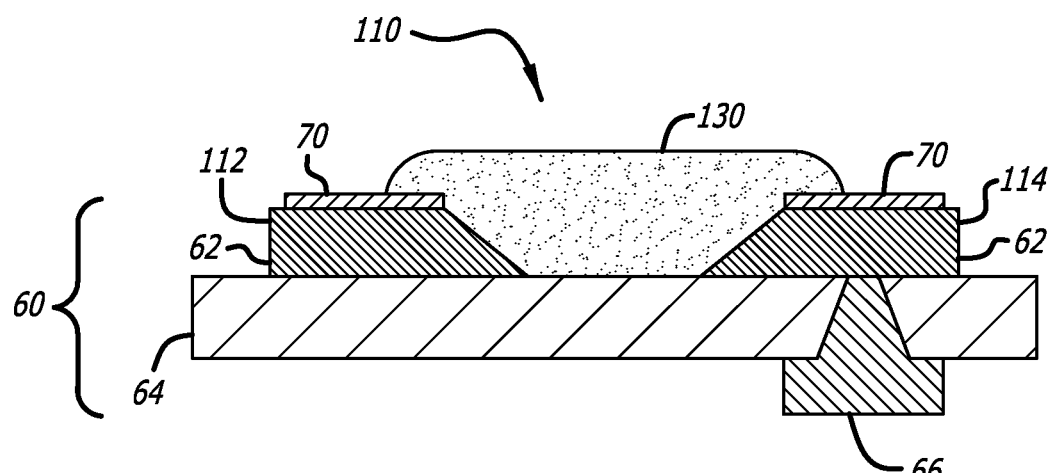
FIG. 17 is a side sectional view of a microactuator according to an additional embodiment in which the microactuator is formed on a flexure.

In an additional embodiment shown in FIG. 17 and its manufacturing process, the PZT microactuator is not formed on as a separate assembly which is later joined to a suspension, but is instead integrally formed upon a flexure. Flexure 60 for a suspension assembly includes SST layer 62, insulating layer 64 such as polyimide, and conductive signal layer 66 such as copper or copper alloy. SST layer 62 is preferably coated with gold 70 or other protective layers in order to inhibit corrosion and/or provide a layer to which PZT element 130 will adequately adhere. PZT material is deposited on SST layer 62, including portions thereof that will define "minus" and "plus" electrodes 112 and 114, respectively, and thereafter sintered and poled. It would likely be advantageous in many applications to selectively pattern the polyimide as in a traditional flexure assembly. It is expected that the polyimide would survive the PZT sintering temperatures, and would reduce the PZT steps if using a printed or dispensed method versus electrophoretic deposition in addition to adding termination means. Stated in basic terms, the PZT actuator would be formed integral to the circuitry eliminating the placement and electrical connection of these small devices.

The PZT material typically shrinks by approximately 8-10% in most sintering operations. Depositing the PZT material over the electrodes and then sintering the PZT material thus shrinks the PZT material in place over the electrodes, placing the device under compression. This constant compression, called "preload" in other PZT microactuator constructions, produces higher stroke and thus provides yet another advantage.

Formed or plated ribs can be formed within the PZT element to assure proper distribution of a stroke force across the PZT from that which would be experienced if the PZT were in the form of a simple thin foil. A thin foil has a tendency to buckle when placed under compression. If corrugations, ribs, or the like are present they will provide mechanical stiffness and reduce the tendency of the PZT to buckle thereby transferring a higher percentage of the PZT expansion force to the suspension. Such electrode ribs can be oriented either longitudinally and/or transversely to the PZT expansion direction, providing both resiliency and/or stiffness. Such features would also reduce buckling when the PZT shrinks during curing.

FIG. 18 is a side sectional view of a microactuator assembly in which v-shaped grooves 17 have been stamped into SST electrodes 12, 14.

Figure 19:
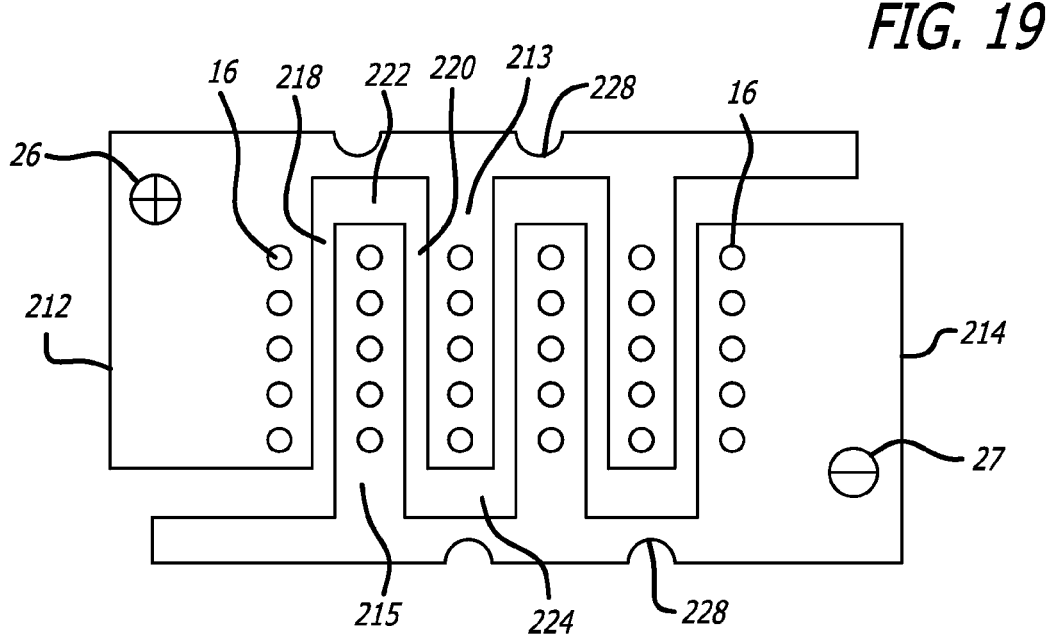
FIG. 19 is top plan view of a patterned electrode sheet of the microactuator of FIG. 20 before the piezoelectric material is added.
Figure 20:
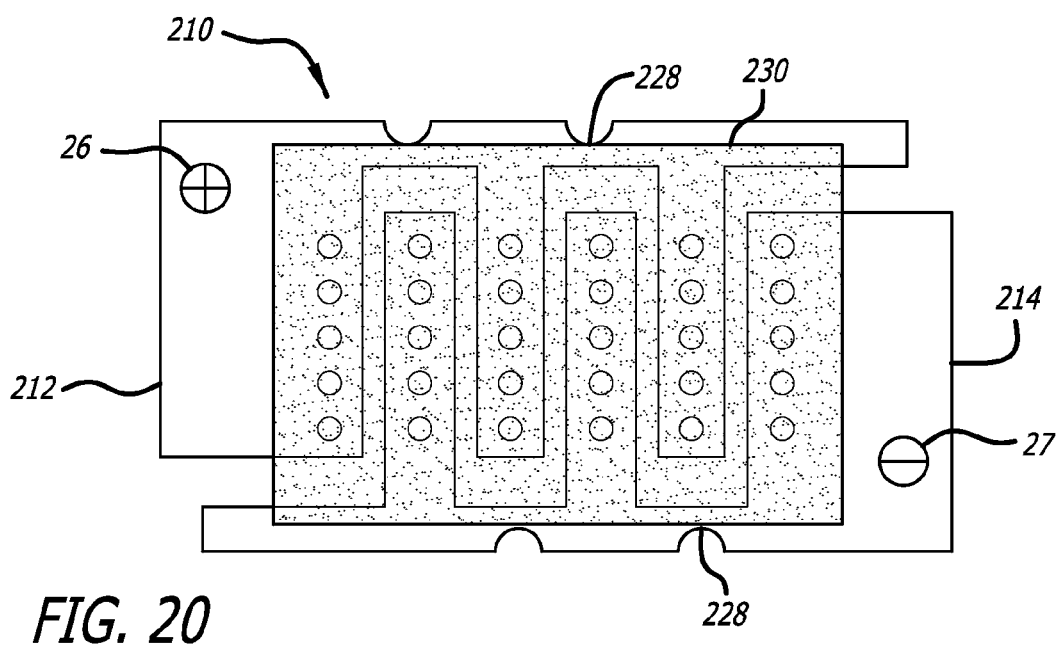
FIG. 20 is a top plan view of a microactuator assembly according to an additional embodiment in which the piezoelectric material comprises a continuous sheet that encompasses different piezoelectrically active areas across different electrode gaps.

FIG. 19 is top plan view of a patterned electrode sheet of the microactuator of FIG. 20 before the piezoelectric material is added. The sheet has been singulated by etching it into two electrodes 212, 214. Visual indicators or indicia 26, 27 are etched into the surface of the SST precursor sheet as part of the same etching step that produced holes or other z-dimension features 16 for anchoring, and electrode gaps 218, 220, 222, and 224. The finished part thus has permanent visual indicators 26, 27 showing the polarity of the device thus making it easier for assembly personnel to install the device with the correct polarities. Visual indicators 26, 27 are shown as "+" and "−" signs. Preferably, the indicators 26, 27 take the form of at least one etched indicia that denotes a polarity, such as "+," "−", "Plus," "Minus," "Positive," "Negative", Ground," a ground symbol, or the like, to help ensure goof-proof electrical connection within the suspension. However, the indicators 26, 27 can take any useful form, and can be incorporated into any of the embodiments disclosed herein.

The device also has mechanical relief features such as notches 228 formed therein in order to relieve the mechanical stress on electrodes 212, 214 as all of the gaps 218, 220 expand or contract. The relief features 228 can be incorporated in the areas of the electrodes between successive fingers of that electrode that connect respective ones of the electrode fingers. The gaps between successive ones of the fingers, define between-finger electrode gaps 218, 220. Additional electrode gaps 222, 224 extend out from associated electrode finger ends in a direction that is parallel to the associated fingers, extending to the opposite electrode. Those gaps define finger-end electrode gaps. Between-finger electrode gaps 218, 220 are narrower than the finger-end electrode gaps 222, 224. Between-finger gaps 218, 220 thus experience higher electric field values than do finger-end gaps 222, 224, and thus the PZT material that spans electrode gaps 218, 220 expands (or contracts) more than does the PZT material between electrode gaps 222, 224. Thus, the device moves more in the x-direction than it does in the y-direction. By controlling the relative gaps widths, the relative amounts of movements of the device in the x- and y-directions when activated can be controlled. In some applications, it may be advantageous to have a PZT microactuator that moves in both the x- and y-directions in a ratio that is specified and controlled.

More generally, in all of the embodiments disclosed it is anticipated that the between-finger gaps will be narrower than the finger-end gaps, and that the relative gap distances can be controlled to produce a desired amount of y-direction movement. However, for all of the embodiments disclosed, the gaps could be selected to be equal.

FIG. 20 is a top plan view of a microactuator assembly 210 employing the electrodes of FIG. 19 and after PZT material 230 has been added. PZT material 230 is deposited as a continuous sheet or layer that fills and covers different piezoelectrically active areas across different electrode gaps, with all of the between-finger gaps being occupied by piezoelectric material. Localized electric fields in and around the gaps cause associated localized expansion or contraction of the piezoelectric material layer 230 when a voltage is applied across the electrodes. When the device is poled using electrodes 212 and 214, then in operation all the gaps 218 and 220 will either all expand or will all contract, depending upon the polarity of the activation voltage applied.

Alternatively, the sheet of PZT material can stop short in the y-direction before the finger-end gaps 222, 224. In that case, the PZT material will extend only over and between the between-finger gaps 218, 220, thus reducing or eliminating a component of movement of the device caused by the finger-end gaps 222, 224. Still further, the PZT material can extend in the y-direction to partially cover and extend partially within the finger-end gaps 222, 224.

Still further, as a slight alternative the PZT material can be applied as, or ablated into, isolated islands of PZT material spanning respective ones of the between-finger electrode gaps. In operation, such isolated islands of PZT material would act much the same as a single sheet of PZT material spanning all between-finger gaps with the between-finger gaps having electric fields therein that produce localized piezoelectric expansion or contraction of the PZT material.

Figure 21:
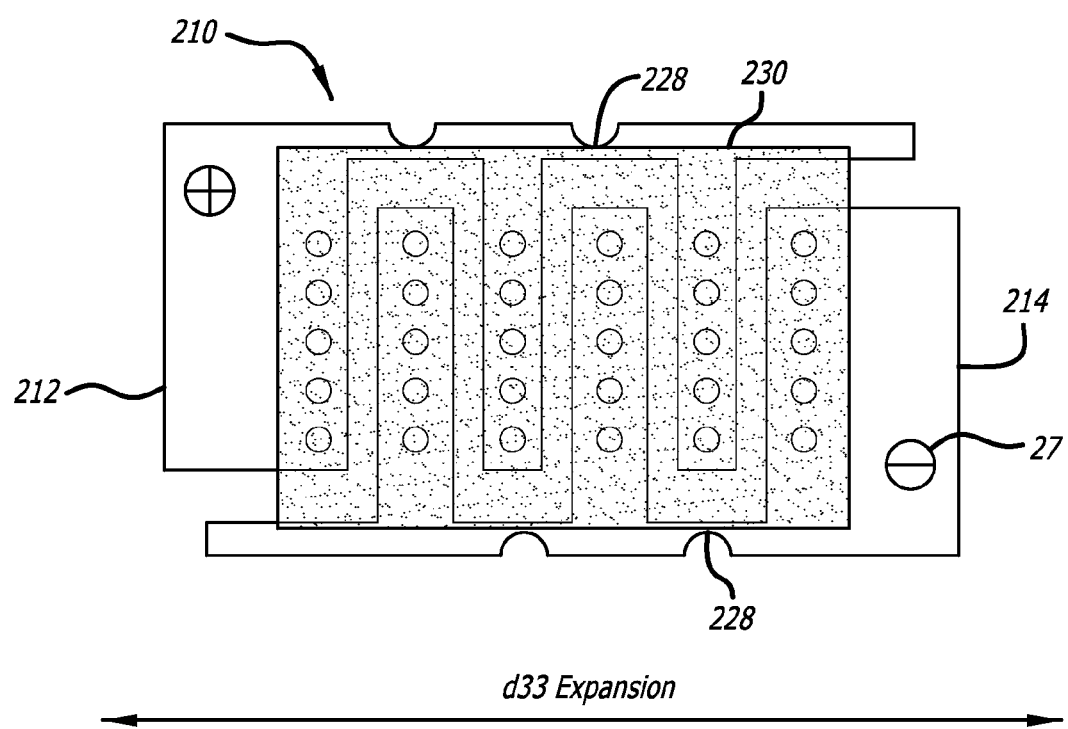
FIG. 21 illustrates the expansion of the microactuator of FIG. 20.

FIG. 21 illustrates the d33 expansion of the microactuator of FIG. 20, i.e., when the PZT material across all of the between-finger gaps expands.

Figure 22:
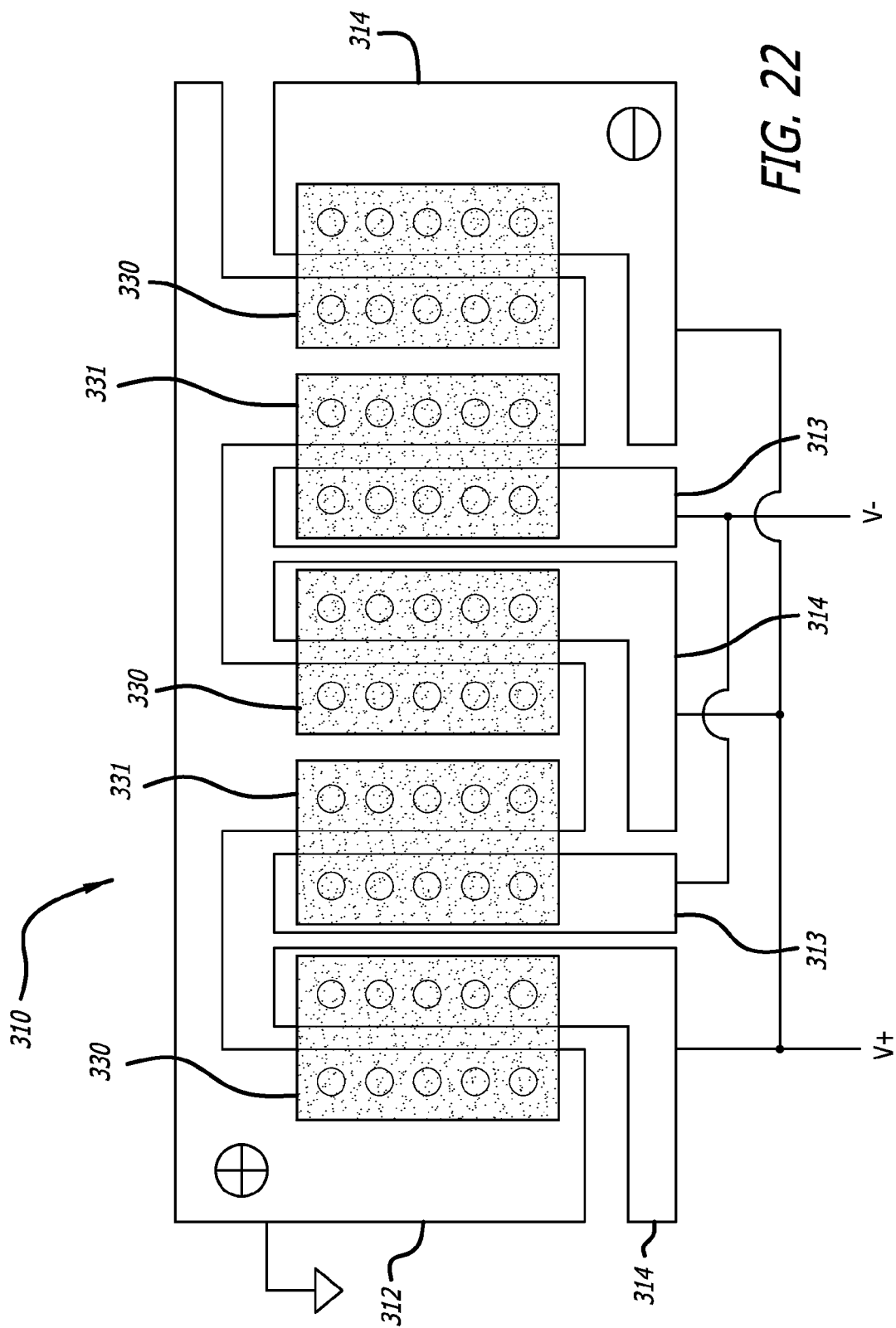
FIG. 22 is a top plan view of a three-pole microactuator showing the poling voltages applied to the device in order to pole it.

FIG. 22 is a top plan view of a three-pole microactuator 310 showing the poling voltages applied to the device in order to pole it. In this embodiment the SST sheet is initially etched into three separate electrodes which we will refer to as the A, B, and C electrodes, being electrodes 312, 314, and 313, respectively. To pole the device, ground is applied to the A electrode 312; a positive poling voltage is applied to electrodes 314; and a negative poling voltage is applied to electrodes 313.

Figure 23:
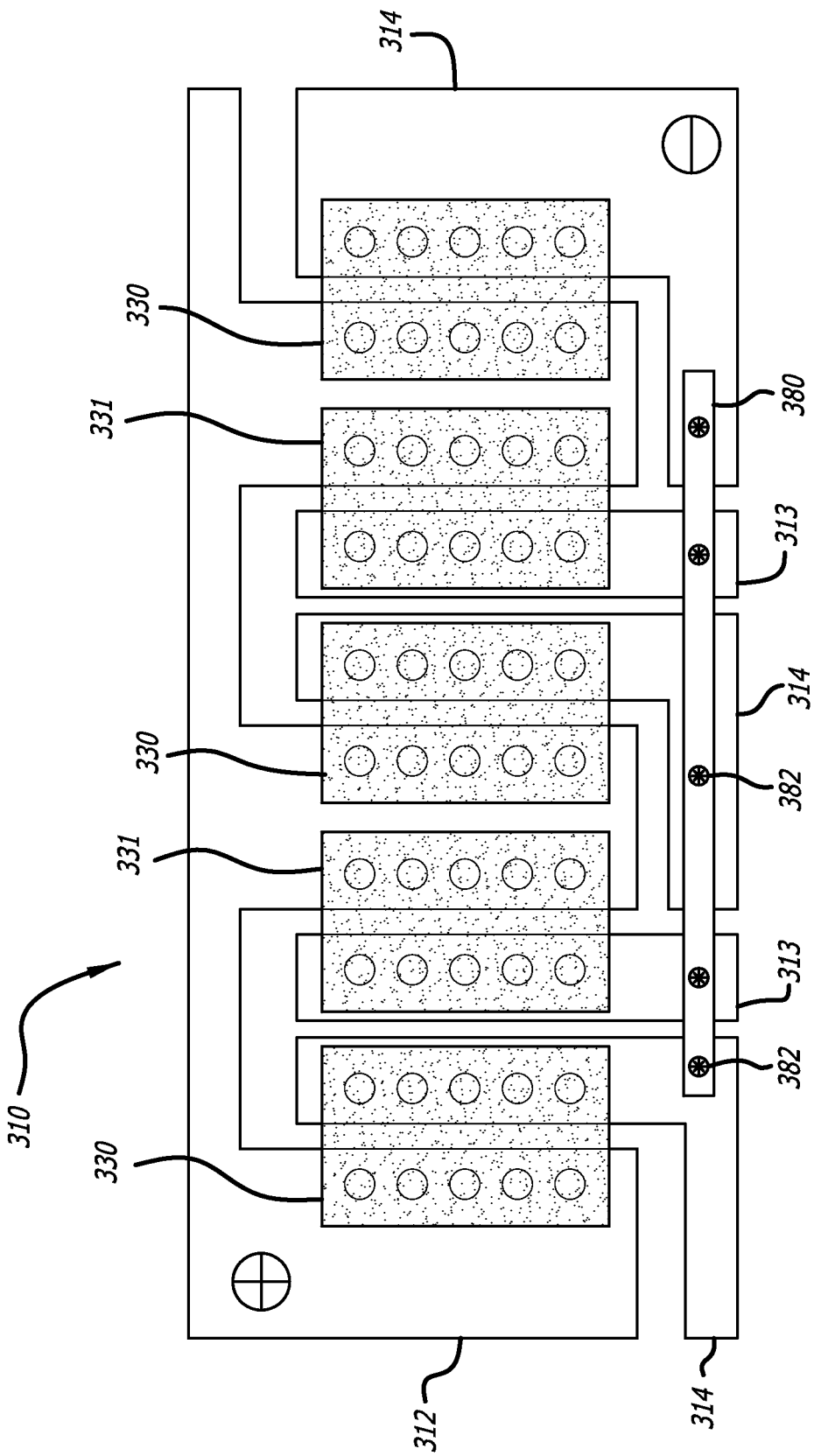
FIG. 23 is a top plan view of the three-pole microactuator of FIG. 22 after two of the poles have been ganged for operational use.
Figure 24:
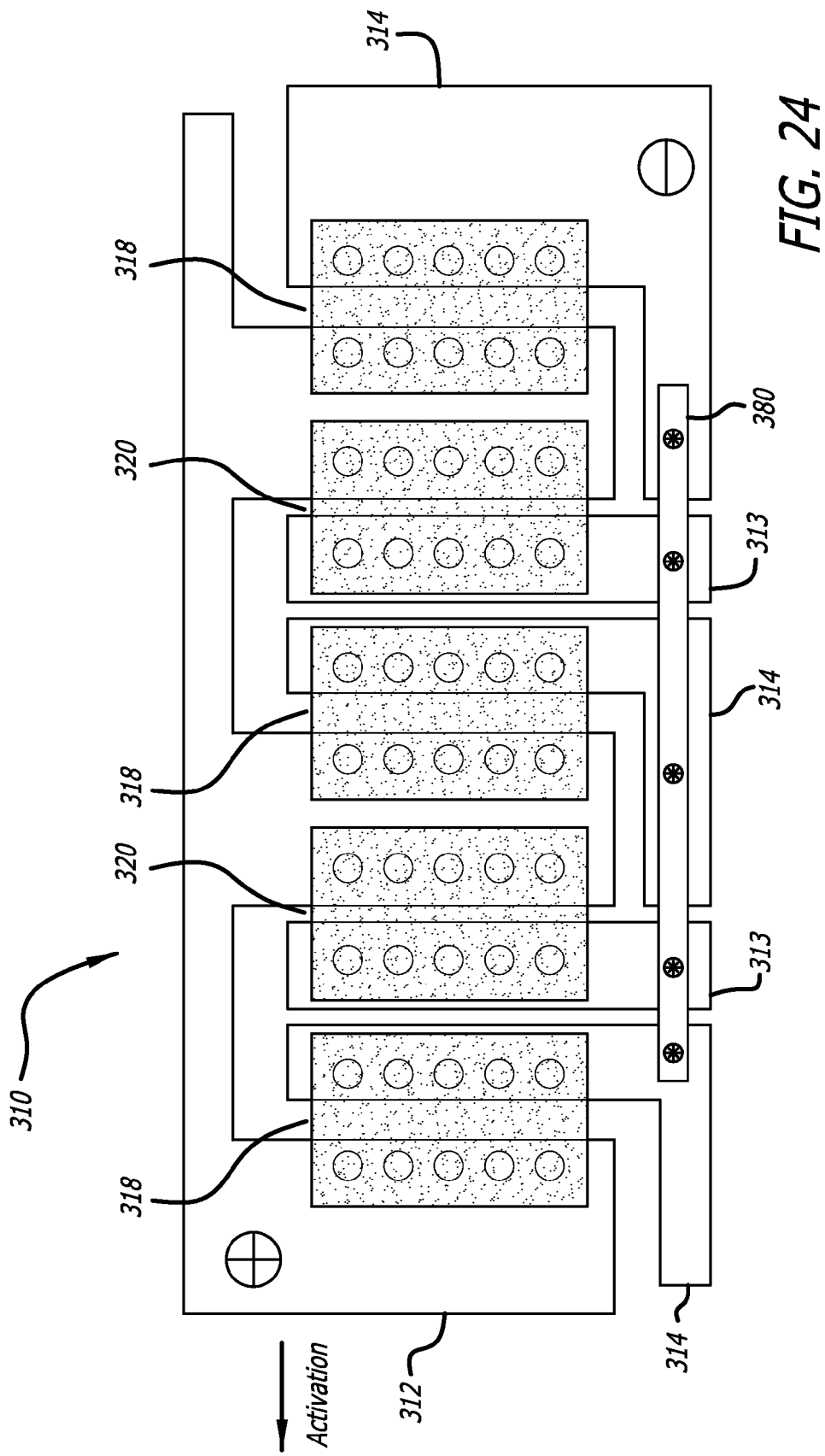
FIG. 24 illustrates the activation movement of the microactuator of FIG. 23.

After poling, two of the electrodes are ganged. FIG. 23 is a top plan view of the three-pole microactuator of FIG. 22 after two of the poles have been ganged such as by welding an SST jumper strip 380 to electrodes 313, 314 at laser weld points 382, thus making the B and C electrodes to be electrically common. Now when a voltage is applied across electrodes 312, 314 such that PZT element 330 expands, PZT element 331 will contract. Thus, the PZT elements have been poled such that alternating ones of the elements 300 expand while interlaced with alternating ones of the PZT elements 331 that contract. The result is that electrode 312 moves to the left relative to electrode 314. Assuming that electrode 314 is stationary with respect to the microactuator as the negative electrode would usually be for example because it is welded to a grounded portion of the suspension, electrode 312 would move to the left as shown in FIG. 24. The device is thus poled such that upon application of a particular polarity of activation voltage to the electrodes 312, 314, every second between-finger gap expands, and every second between-finger gap contracts, with the expanding and contracting gaps alternating.

Figure 25:
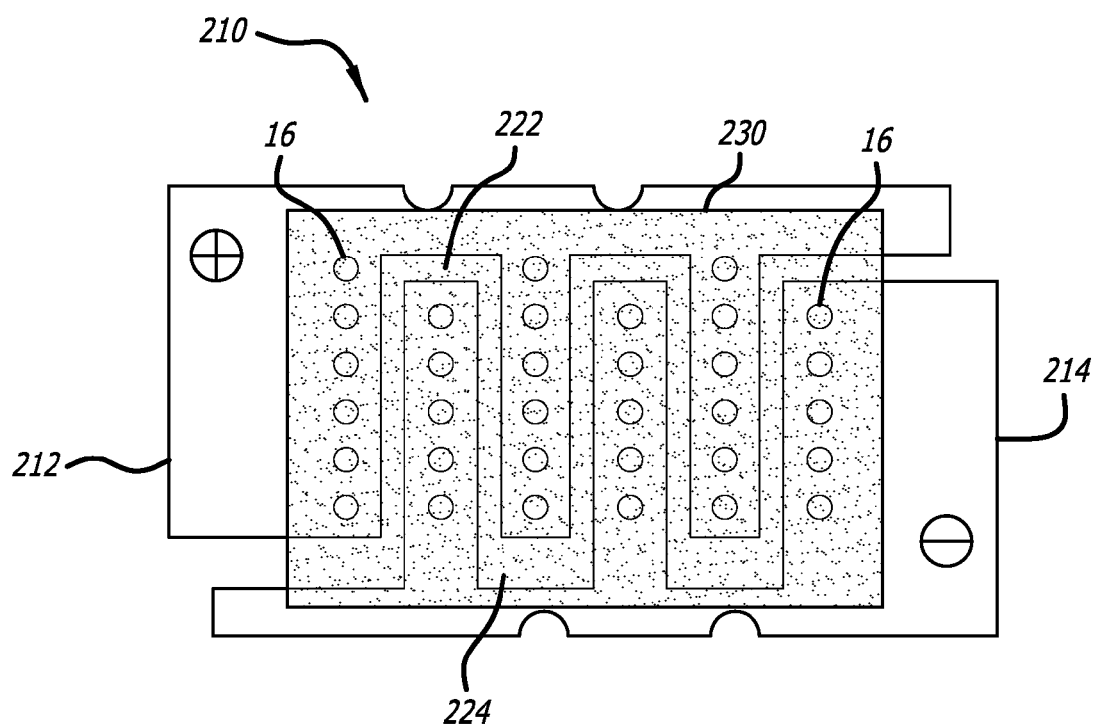
FIG. 25 is a top plan view of a microactuator assembly according to an additional embodiment.

FIG. 25 is a top plan view of a microactuator assembly according to an additional embodiment in which the pattern of holes 16, or more generally the pattern of z-dimension features, is asymmetric from one electrode finger to the next. The presence or absence of holes 16 in the electrodes affects the electric fields across the between-finger gaps. In this particular illustrative example, the holes are arranged in a pattern of 6/5/6/5/6/5 in number. It is expected that by employing an asymmetric pattern of holes or other features that affect the electric fields across the gaps, the device may be made to rotate slightly. A microactuator that rotates in addition to moving linearly could be advantageous depending on the particular application. Additionally, the top finger-end gaps 222 are narrower than bottom finger-end gaps 224, producing another asymmetry in the device and thus also producing rotation.

More generally, the techniques disclosed herein of adjusting the gap widths and adjusting the asymmetry of z-dimension features to produce x-direction movement combined with a controlled amount of y-direction movement and/or a controlled amount of rotation, can be used with any of the embodiments disclosed.

Figure 26:
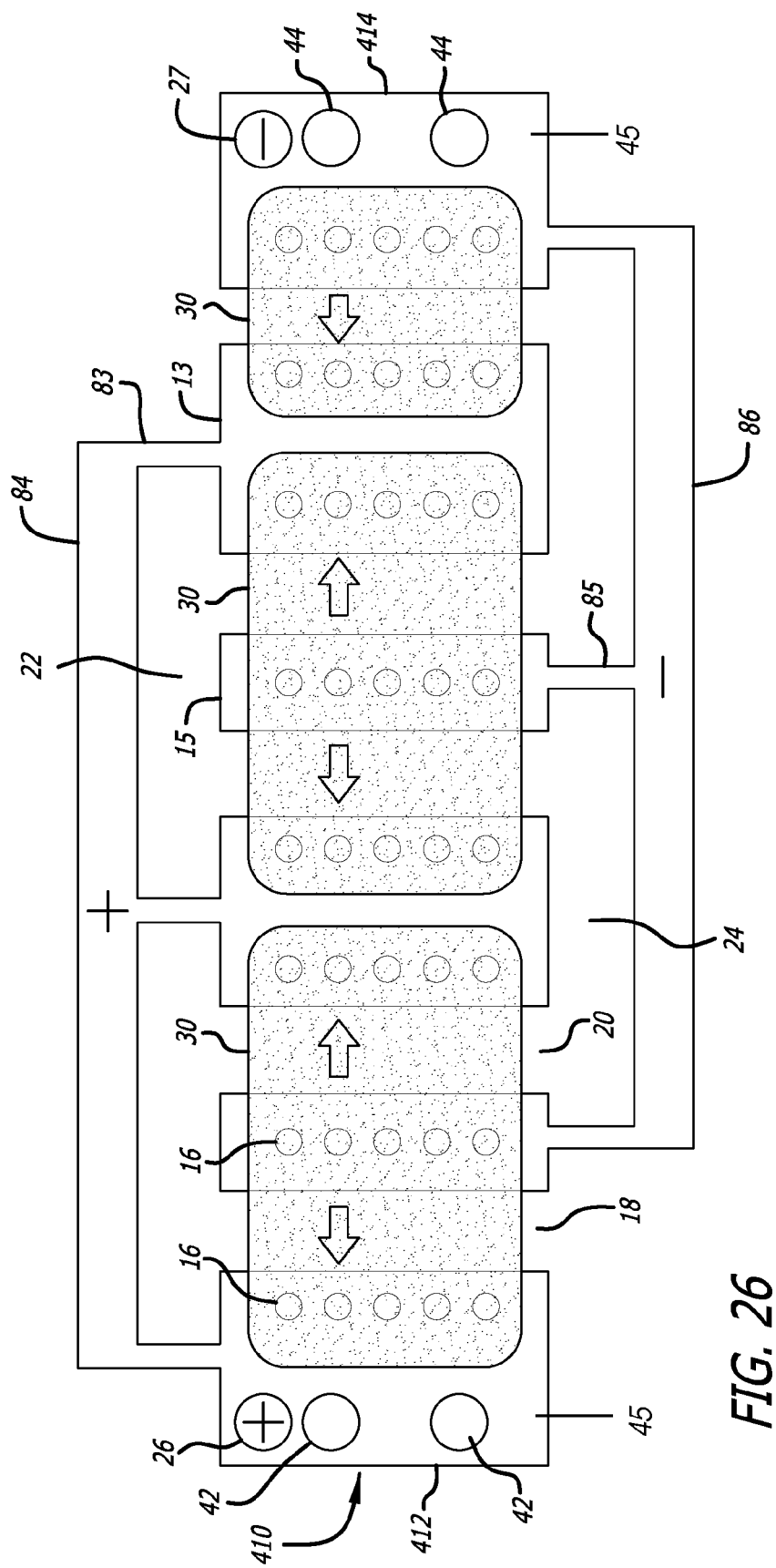
FIG. 26 is a top plan view of a microactuator assembly according to yet another embodiment.

FIG. 26 is a top plan view of a microactuator assembly 410 according to yet another embodiment in which the electrode fingers 13, 15 are not mechanically coupled together strongly. Instead, "plus" electrode fingers 13 are connected via thin ribbon connectors 83 to "plus" bus bar 84. Similarly, "minus" electrode fingers 15 are connected via thin ribbon connectors 85 to "minus" bus bar 86. The arrows indicate the direction of expansion of the PZT elements 30. Ribbon connectors 83, 85 may be sufficiently flexible that the "plus" electrode fingers 15 can move relatively independently of each other, and "minus" electrode fingers 13 can move relatively independently of each other. Ribbon connectors 83, 85 perform a mechanical relief function similar to that of mechanical relief notch 228 shown in other embodiments. As with the embodiment of FIG. 8, the device may be welded to the suspension at weld locations 42, 44 located on electrode extension portions 45 which extend outwardly from the piezoelectric elements 30 and which are not covered by piezoelectric material that they are suitable for welding.

The microactuator of the present invention according to any of the embodiments could also be formed and/or mounted on a flexible substrate to provide physical support for the device, if additional support is needed. Still further, the device can be formed in-situ either on suspension components including the base plate, the load beam, the gimbal, or the flexure, or can be formed separately and affixed later to the suspension such as by laser welding.

It will be understood that the terms "generally," "approximately," "about," "substantially," and "coplanar" as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," "below," and "z-dimension," as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A microactuator assembly for a dual stage actuated disk drive suspension, the assembly comprising:
   piezoelectric material extending generally in a horizontal plane;
   a plurality of first electrode fingers disposed generally in said horizontal plane and adjacent the piezoelectric material;
   a plurality of second electrode fingers disposed generally in said horizontal plane and adjacent the piezoelectric material, the first and second electrode fingers being interlaced to define an interlaced comb structure;

the first electrode fingers and interconnections therebetween being formed integrally of a unitary piece of generally flat metal to define a first unitary electrode;

the second electrode fingers and interconnections therebetween being formed integrally of a unitary piece of generally flat metal to define a second unitary electrode;

the first and second unitary electrodes having respective first and second extension portions disposed at respectively opposite ends of the assembly, the extension portions being suitable for welding thereat.

2. The microactuator assembly of claim 1 wherein each of the first and second extension portions have respective visual polarity indicators etched therein.

3. The microactuator assembly of claim 1 wherein each of the first and second extension portions have weld locations at which the microactuator assembly is welded to a suspension component.

4. The microactuator assembly of claim 1 wherein the first and second unitary electrodes each comprise stainless steel.

5. A microactuator assembly for a dual stage actuated disk drive suspension, the assembly comprising:
a first metal plate defining a first electrode, the first metal plate having a first plurality of fingers extending therefrom;
a second metal plate defining a second electrode, the second metal plate having a second plurality of fingers extending therefrom, the second plurality of fingers interlaced with the first plurality of fingers and defining respective electrode gaps between adjacent ones of the fingers, and with successive ones of the interlaced fingers proceeding in a first direction; and
a plurality of piezoelectric elements disposed between respective ones of the fingers thereby spanning respective ones of the electrode gaps, the plurality of piezoelectric elements arranged such that successive ones of the piezoelectric elements proceed generally in the first direction and are not vertically stacked relative to one another;
wherein:
the piezoelectric elements are poled such that when a voltage differential is applied across the first and second electrodes, the piezoelectric elements all expand in their d33 mode along a line that extends through individual ones of the piezoelectric elements; and
the first and second electrodes have z-dimension features formed therein, the piezoelectric elements extending into the z-dimension features thereby anchoring the piezoelectric elements to the electrodes.

6. The microactuator assembly of claim 1 wherein the z-dimension features are selected from the group consisting of through-holes, recesses, valleys, channels, ribs, ridges, and castellations.

7. The microactuator assembly of claim 1 wherein the microactuator assembly is integrally formed on the suspension, the piezoelectric elements being disposed directly on integral stainless steel parts of the suspension.

8. The microactuator assembly of claim 1 wherein the microactuator assembly comprises an assembly that is was formed separately from the suspension and is adapted to be affixed to the disk drive in order to produce fine movements of a read/write head thereof.

9. In combination, the microactuator assembly of claim 8 and the suspension welded together.

10. A microactuator assembly for a dual stage actuated disk drive suspension, the assembly comprising:
a first electrode integrally formed of a first unitary piece of metal, the first electrode comprising:
a first plurality of elongate conductive components electrically connected together for application of a first electric potential thereto, the first plurality of elongate conductive components defining first electrode fingers;
a first connector electrically connecting the first electrode fingers; and
a generally flat first extension portion;
a second electrode integrally formed of a second unitary piece of metal, the second electrode comprising:
a second plurality of elongate conductive components electrically connected together for application of a second electric potential thereto, the second plurality of elongate conductive components defining second electrode fingers;
a second connector electrically connecting the second electrode fingers; and
a generally flat second extension portion;
the first and second electrode fingers being arranged to define a plurality of respective electrode gaps therebetween; and
at least one piezoelectric element spanning the electrode gaps, the at least one piezoelectric element being poled such that when an electric potential is applied across the first and second electrodes thereby creating respective electric fields across the electrode gaps, the at least one piezoelectric element expands or contracts in response to said electric fields such that the electrode gaps widen or narrow;
wherein:
the at least one piezoelectric element and the electrode gaps are arranged serially such that expansion of the gaps causes an expansion of the microactuator in a direction that is generally the same as a line drawn through the piezoelectric elements; and
the first and second electrode extension portions extend past the at least one piezoelectric element and are not covered thereby, and are suitable for welding to a suspension component.

11. The microactuator assembly of claim 9 wherein successively arranged electrode gaps are spanned by piezoelectric material that is poled such that when an electric potential is applied across the electrodes all of the piezoelectric material spanning the gaps expands or all of the piezoelectric material spanning the gaps contracts.

12. The microactuator assembly of claim 10 wherein the microactuator assembly has piezoelectric material on only a single vertical layer.

13. The microactuator assembly of claim 10 wherein the at least one piezoelectric element comprises a continuous thin film piezoelectric material layer spanning a plurality of said electrode gaps, with localized electric fields in and around said gaps causing associated localized expansion or contraction of the piezoelectric material layer when a voltage is applied across the electrodes.

14. The microactuator assembly of claim 10 wherein:
the electrodes have mechanical relief features formed therein to accommodate expansion or contraction of the assembly.

15. The microactuator assembly of claim 14 wherein:
the mechanical relief features comprise notches of reduced width; and
respective notches are located on respective portions of the electrodes that connect respective ones of the electrode fingers.

16. The microactuator assembly of claim 10 wherein z-dimension features comprise at least one of through-holes, recesses, valleys, channels, ribs, ridges, and castellations.

17. The microactuator assembly of claim 10 wherein at least one of the electrodes has a visual indicator etched therein to visually differentiate between the first and second electrodes, the visual indicator having been etched as part of an etching step that also at least partially separated the first and second electrodes in a precursor sheet of metal.

18. The microactuator assembly of claim 10 wherein:
said electrode gaps define between-finger electrode gaps;
said electrode fingers have respective ends;
electrode gaps extending out from the respective electrode finger ends in a direction parallel to associated fingers, and to an opposite electrode, define finger-end electrode gaps; and
the between-finger electrode gaps are narrower than the finger-end electrode gaps.

19. In combination, the microactuator assembly of claim 10 and the suspension welded together by welds at the first and second extension portions.

20. The microactuator assembly of claim 10 wherein each of the first and second electrodes comprise a stainless steel sheet.

21. A microactuator assembly for a dual stage actuated disk drive suspension the assembly comprising:
a first electrode comprising a first plurality of elongate conductive components electrically connected together for application of a first electric potential thereto, the first plurality of elongate conductive components defining first electrode fingers;
a second electrode comprising a second plurality of elongate conductive components electrically connected together for application of a second electric potential thereto, the second plurality of elongate conductive components defining second electrode fingers;
the first and second electrode fingers being arranged to define a plurality of respective electrode gaps therebetween; and
a plurality of isolated islands of piezoelectric material, each island spanning an associated one of the electrode gaps, each island defining a piezoelectric element, the piezoelectric elements being poled such that when an electric potential is applied across the first and second electrodes thereby creatin respective electric fields across the electrode gaps, the piezoelectric elements expand or contract in response to said electric fields such that the electrode gaps widen or narrow;
wherein the piezoelectric elements and the electrode gaps are arranged serially such that expansion of the gaps causes an expansion of the microactuator in a direction that is generally the same as a line drawn through the piezoelectric elements.

22. A microactuator assembly for a dual stage actuated disk drive suspension the assembly comprising:
a first electrode comprising a first plurality of elongate conductive components electrically connected together for application of a first electric potential thereto, the first plurality of elongate conductive components defining first electrode fingers;
a second electrode comprising a second plurality of elongate conductive components electrically connected together for application of a second electric potential thereto, the second plurality of elongate conductive components defining second electrode fingers;
the first and second electrode fingers being arranged to define a plurality of respective electrode gaps therebetween; and
at least one piezoelectric element spanning the electrode gaps, the at least piezoelectric element being poled such that when an electric potential is applied across the first and second electrodes thereby creating respective electric fields across the electrode gaps, the at least one piezoelectric ent ex ands or contracts in response to said electric fields such that the electrode gaps widen or narrow;
wherein:
the at least one piezoelectric element and the electrode gaps are arranged serially such that expansion of the gaps causes an expansion of the microactuator in a direction that is generally the same as a line drawn through the piezoelectric elements;
the first and second electrode fingers have z-dimension features formed therein, and the at least one piezoelectric element extends into the z-dimension features whereby the at least one piezoelectric element is anchored to the electrode fingers; and
the z-dimension features of some of the electrode fingers are asymmetric with respect to other ones of the electrode fingers, causing the two electrodes to experience a component of relative rotational movement when said electric potential is applied across the electrodes.

\* \* \* \* \*